July 30, 1968 J. L. WARNER ETAL 3,394,756
POROUS PLATE CONDENSER
Filed May 1, 1967
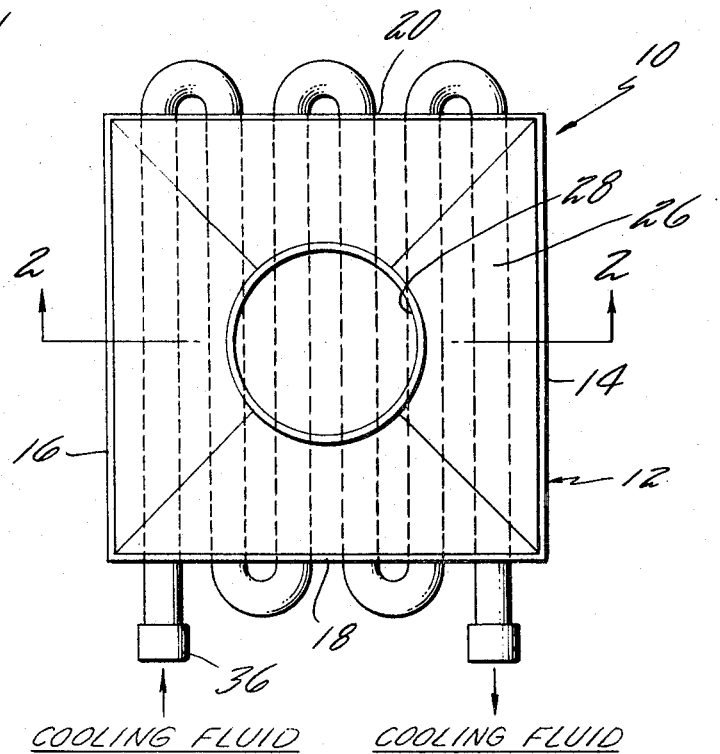
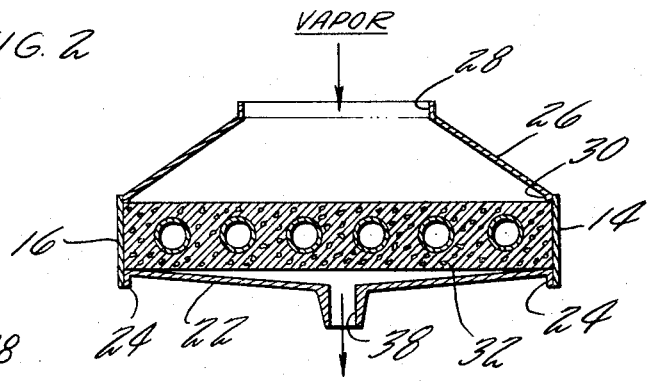
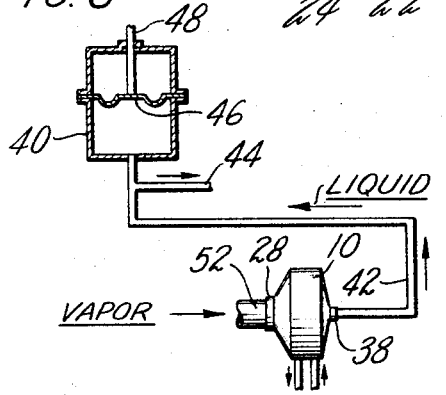
INVENTORS
JOHN L. WARNER
JAMES F. WILBER III
RICHARD P. BLAIS
BY Norman Friedland
ATTORNEY : 3,394,756
Patented July 30, 1968

---

3,394,756
POROUS PLATE CONDENSER
John L. Warner, Simsbury, James F. Wilber III, Hazardville, and Richard P. Blais, Rockville, Conn., assignors to United Aircraft Corporation, East Hartford, Conn., a corporation of Delaware
Continuation-in-part of application Ser. No. 502,057, Oct. 22, 1965. This application May 1, 1967, Ser. No. 646,791
1 Claim. (Cl. 165—110)

ABSTRACT OF THE DISCLOSURE

A condenser, adapted for use in a zero "G" field or where its attitude is subjected to changes, is constructed with a porous member forming a separation barrier between the vapor and condensate and the surface adjacent the vapor is substantially the same size as the surface adjacent the condensate. Means are provided to assure that the surface adjacent the condensate is wet at substantially all times. Tubes embedded in the porous plate carry a cooling medium for transferring heat therefrom to condense the vapor.

---

Cross-reference to related application

This application is a continuation-in-part of our co-pending application Ser. No. 502,057, filed Oct. 22, 1965, now abandoned for "Condenser."

Background of the invention

This invention relates to condensers and particularly to condensers adapted to operate independently of the atmosphere and attitude to which it is subjected.

The heretofore known types of condensers utilized to condense vapor to obtain liquid rely on gravity force, centrifugal force, scrubbing or the like for effecting separation of the liquid from the vapor on the condensing surface. In an atmosphere free from gravity, for example, it would be necessary to utilize some externally created force, such as a centrifugal created field, to separate the condensed moisture from air. It also is desirable or even necessary in certain applications in a gravity field to assure that the condenser operates in any attitude.

We have found that we can obviate the problems noted above by utilizing a porous member capable of condensing vapor and separating the condensate from the vapor without the need of a gravity force or an externally created force. This, of course, is of paramount importance in air and space craft since it eliminates the need of external power and it operates in any environment (gravity and nongravity) and in any attitude.

Summary of invention

It is therefore an object of this invention to provide means for condensing vapor in a gravitational and non-gravitational atmosphere, in any attitude, which means are characterized as being relatively simple to manufacture, economical to build and yet capable of rugged and reliable use.

A still further object of this invention is to condense vapor and separate the condensate without the use of externally created forces.

Another object of this invention is to provide an improved condenser utilizing a sintered metal block wherein a large ratio of area to volume within the block allows the condensate to be efficiently collected.

Other features and advantages will be apparent from the specification and claim and from the accompanying drawings which illustrate an embodiment of the invention.

Brief description of the drawing

FIGURE 1 is a plan view showing one possible embodiment of this invention;
FIGURE 2 is a sectional view taken along line 2—2 of FIG. 1; and
FIGURE 3 is a schematic illustration showing the use of the condenser in an exemplified application.

Description of the preferred embodiment

Referring now particularly to the details of this invention as can be seen by referring to FIGS. 1 and 2, the condenser, generally illustrated by numeral 10, is made up of a housing 12 having side walls 14, 16, 18 and 20 joined at the respective corners for defining a rectangular cavity section. A bottom plate 22 having end flanges 24 abuts against the inner surface of the side plates 14 and 16 and is secured thereto in a suitable manner. The top portion 26 terminating in opening 28 carries a flange 30 which also abuts against the inner surface of the side walls and is suitably joined thereto. Porous heat transfer plate 32 is supported to the side walls of the housing 12. A plurality of passages are formed in the porous member for receiving the tube 36 which follows a serpentine path. Cool fluid is introduced through the tube for cooling the porous plate 32. Vapor introduced through opening 28 comes in contact with the top surface of porous plate 32 and owing to the heat transfer between the cool fluid and the vapor, the vapor or a constituent of the vapor is condensed on the top surface. The capillary force of the pores of the porous members causes the liquid to migrate to the other surface of the member while at the same time preventing the vapor from passing therethrough. A pressure drop may be created across the top and bottom surfaces of the porous member to augment the separating capabilities of the condenser as well as serving to drain the bottom thereof through vent 38.

While the choice of shape and material utilized for the porous member is virtually unlimited and predicated on its particular application, the material, however, must exhibit good heat transfer and capillary force characteristics and must be wettable or hydrophilic. Heat may be removed from the porous plate 32 by any well known means in addition to the one shown herein. Examples of materials of porous members that are satisfactory are sintered nickel, titanium, steel and aluminum metals.

For obtaining efficacious condensing, the bottom surface of porous member 32 adjacent the outlet 38 is always subjected to liquid (condensate). It is contemplated that the condenser would be employed in a closed loop circuit, as for example, a refrigeration or cooling system or a liquid removal system where the liquid is vented at a rate maintaining the liquid level adjacent the porous plate sufficiently to keep it wet.

An exemplary embodiment of condensers used in a water reclamation system is shown in FIG. 3 wherein condenser 10 is connected to reservoir 40 via conduit 42. Like reference numerals refer to like elements in the context of this disclosure. A feed line 44 is suitably connected to line 42 at a point between reservoir 40 and condenser 10. If the system is employed in a nongravitational field, means for directing fluid from the reservoir 40 must be employed. To this end, diaphragm 46 suitably connected within reservoir and actuated by plunger 48 connected to a suitable actuator (not shown) would suffice.

From the foregoing, it is apparent that water in this instance, but could be any other fluid, always fills chamber 50 of FIG. 2, noting that the discharge port 38 of FIG. 2 communicates with line 42 of FIG. 3, and vapor in line 52 of FIG. 3 is admitted into inlet 28 of FIG. 2.

Since the bottom surface of porous plate 32 will always be immersed in the condensed liquid so that the entire porous plate will be effective as a condensing body, maximum condensing is achieved. Obviously, this lends the unit to be a highly effective condenser, maintaining weight and size at a minimum, which is a prime consideration in flight applications. When the condenser is utilized solely as a moisture remover, it is contemplated that the rate in which liquid is bled off, the rate at which the condenser operates, and the size of the reservoir will be designed to maintain the bottom surface of the porous plate submerged in liquid.

It should be understood that the invention is not limited to the particular embodiments shown and described herein, but that various changes and modifications may be made without departing from the spirit or scope of this novel concept as defined by the following claim.

We claim:
1. A condenser adapted to operate independently of its attitude and the environment to which it is subjected comprising, in combination,
   a housing having an inlet and an outlet,
   a porous flat plate-like member characterized as having a pore size sufficiently small to exhibit good capillary forces and the material of the porous flat plate-like member being wettable,
   said porous flat plate-like member extending across the housing and bearing against the side walls means of the housing, for defining therewith a pair of chambers,
   one of said chambers communicating with said inlet,
   the other of said chambers communicating with said outlet,
   means to immerse the entire bottom surface of said porous flat plate-like member in said chamber adjacent said outlet completely in the condensate,
   heat transfer tubes imbedded in said porous flat plate-like member having an inlet and outlet,
   means for leading cooling fluid from said inlet and said outlet of said heat transfer tubes for cooling said porous flat plate-like member so as to condense vapor received in the chamber adjacent said housing inlet, whereby
   said porous member by capillary forces conducts the condensate to said other chamber.

References Cited
UNITED STATES PATENTS

| | | | |
|---|---|---|---|
| 2,401,797 | 6/1946 | Rasmussen | 165—180 X |
| 3,168,137 | 2/1965 | Smith | 165—110 |
| 3,170,512 | 2/1965 | Smith | 165—110 |
| 3,196,634 | 7/1965 | Rich | 165—110 X |
| 3,289,752 | 12/1966 | Staub | 165—110 |

ROBERT A. O'LEARY, *Primary Examiner.*

A. W. DAVIS, JR., *Assistant Examiner.*